April 30, 1935.  W. J. COULTAS  1,999,868
MOWER
Filed July 12, 1934

INVENTOR
Wilbur J. Coultas.
BY
ATTORNEY

Patented Apr. 30, 1935

1,999,868

UNITED STATES PATENT OFFICE 1,999,868

MOWER

Wilbur J. Coultas, Moline, Ill., assignor to Deere & Company, Moline, Ill., a corporation of Illinois Application July 12, 1934, Serial No. 734,776

8 Claims. (Cl. 56—276)

This invention relates to mowers, and more particularly to mowers of the type in which the cutter bar is connected at its inner end to a yoke member which is connected to the frame by means of a thrust bar, and in which the yoke member has a sleeve portion journaled upon a bearing portion on the thrust bar and disposed between two spaced abutments on the bearing portion. In mowers of this type it is occasionally desirable to adjust the position of the yoke member relative to the thrust bar in order to maintain proper registration between the knife sections of the sickle carried by the cutter bar and the guard fingers fixed to the cutter bar. To this end it has been common practice to provide one or more spacers in the form of circular washers disposed between the ends of the sleeve portion of the yoke member and the abutments, the adjustment of the sleeve portion on the bearing portion being made by shifting one or more of the washers from one end of the sleeve portion to the other.

Heretofore it has been necessary to completely remove the yoke member from the thrust bar when shifting one or more of the washers from one end of the sleeve portion to the other when making such adjustment. This procedure was somewhat laborious in that in order to completely remove the yoke member from the thrust bar it was necessary to make a number of other disconnections, namely the connections from the yoke member to the lifting lever, the connections from the yoke member to the tilting lever, and also the pull bar connection between the yoke member and the mower frame. Disconnecting the yoke member from the lifting lever also necessitated disconnecting the counter-balancing spring.

The object of this invention is to provide improved spacing means to be disposed between the ends of the sleeve portion of the yoke member and the abutments on the thrust bar which may be shifted from one position to the other without removing the yoke member from the thrust bar and thereby eliminate the necessity of having to make the various disconnections heretofore required. This object is accomplished primarily by making the spacers of U-shape formation together with means on the sleeve portion of the yoke member interlocking with the spacers to hold the latter in position, from which the spacers may be disengaged by a relatively slight axial movement of the spacers relative to the bearing portion of the thrust bar or by a relatively slight axial movement of the sleeve portion of the yoke member on the thrust bar, such as is permitted with all the above-mentioned connections remaining intact. By reason of the spacers being U-shaped rather than in the form of circular washers, they can be readily placed in position over the bearing portion of the thrust bar adjacent either end of the sleeve portion thereof without having to remove the yoke member from the thrust bar.

A preferred embodiment of my invention is described in the following specification in connection with the accompanying drawing in which.

Figure 1:
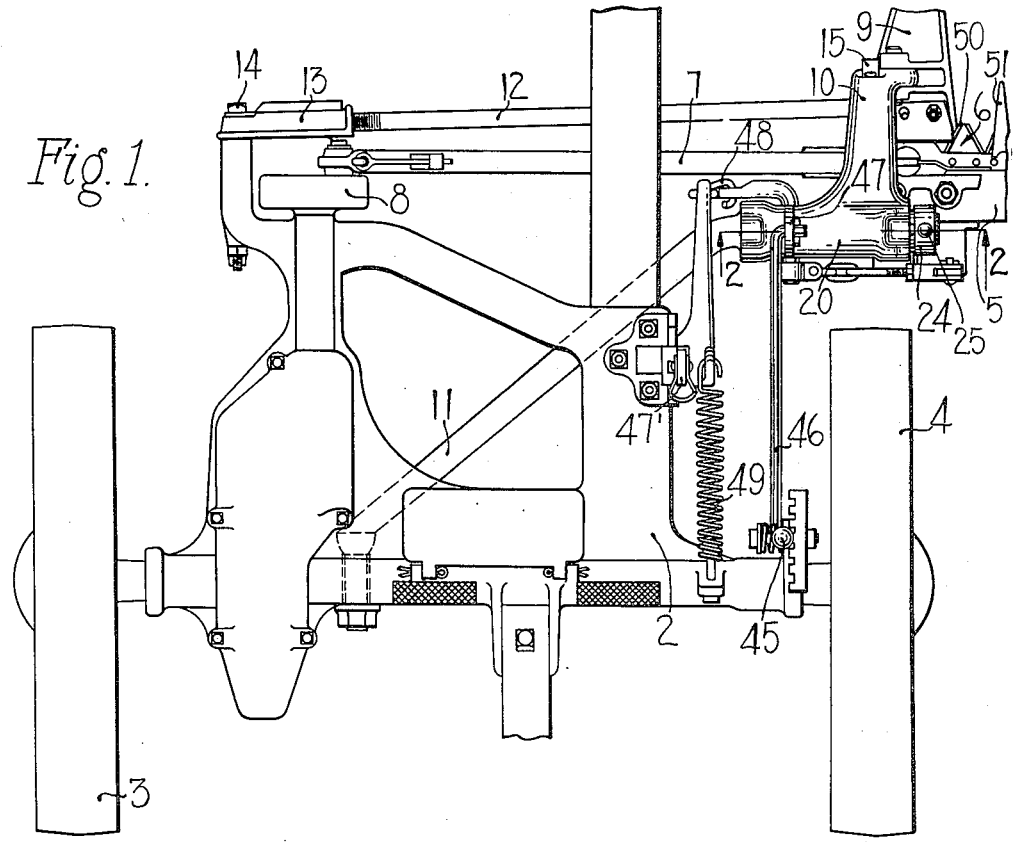
Figure 1 is a plan view of a mower modified in accordance with my invention.

The mower shown in the drawing comprises a frame 2 supported on a pair of wheels 3 and 4, and a cutter bar 5 upon which a sickle 6 is slidingly disposed and which is connected by means of a pitman 7 to a crank wheel 8 driven through suitable gearing from power derived from the supporting wheels 3 and 4. At its inner end cutter bar 5 is fixed to a shoe 9 which is pivotally connected for vertical movement about a longitudinal axis to a yoke member 10. Yoke member 10 is connected to the mower frame 2 by means of a thrust bar 11 and pull bar 12. Pull bar 12 has a threaded connection with a socket member 13 pivotally connected to a bolt 14 carried on frame 2. The opposite end of pull bar 12 has a bent portion 15 which is pivotally connected to the forward end of yoke member 10.

Figures 2, 3:
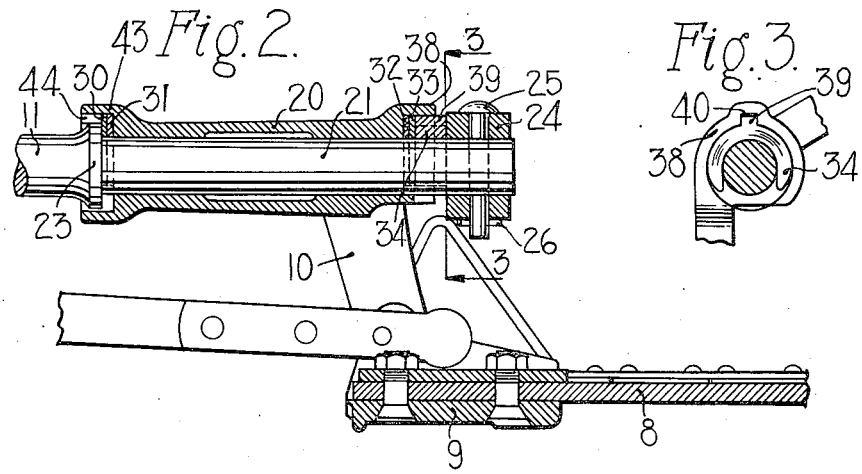
Figure 2 is a cross-sectional view along the line 2—2 of Figure 1.
Figure 3 is a cross-sectional view along the line 3—3 of Figure 2.

Yoke member 10 has a sleeve portion 20 formed integrally therewith which is journaled over a laterally extending bearing portion 21 formed on one end of thrust bar 11. The opposite end of thrust bar 11 is pivotally connected to frame 2 of the mower. Sleeve portion 20 is disposed between a pair of abutments 23 and 24 on opposite ends of bearing portion 20. Abutment 23 is in the form of a flange formed integral with the thrust bar; and abutment 24 is in the form of a circular collar removably held in position on the outer end of bearing portion 21 by means of a pin 25 disposed in transversely extending aligned holes in abutment 24 and the outer end of sleeve portion 21. A cotter pin 26 locks pin 25 in position. Yoke member 10 is held in position on bearing portion 21 by means of spacers 30 and 31 shown in the drawing as being disposed between abutment 23 and the inner end of sleeve portion 20, and spacers 32, 33 and 34 shown in the drawing as being disposed between the outer end of sleeve portion 20 and abutment 24. While the several washers are of different thicknesses, for a purpose to be described presently, they are otherwise of the same shape, being generally of U-shape and adapted to fit loosely over bearing portion 21, as best shown in Figure 3. The spacers adjacent abutment 24 are held in position by means of a circumferentially disposed axially extending flange 38, the inner diameter of which is equal to or slightly greater than the outer diameter of the spacers to embrace the outer periphery of the spacers. To prevent the spacers from turning relative to the bearing portion 21, each spacer is provided with a radially outwardly extending lug 39 which is adapted to be received in an axially extending recess 40 formed in the inner wall of the flange 34. The spacers adjacent the abutment 23 are held in position in a similar manner by means of a circumferentially disposed axially extending flange 43 which embraces the outer periphery of these spacers. These spacers are also held against turning upon bearing portion 21 by means of radially outwardly extending lugs, similar to lugs 39, which are adapted to be received in an axially extending recess 44 formed in the inner wall of flange 43. Spacers 30 to 34 have a combined thickness such that when in position, the sleeve portion 20 of yoke member 10 will be snugly held against any axial movement relative to bearing member 21, but will nevertheless be free to rock thereabout for purposes of adjusting the tilt of the cutter bar 5 under the control of tilting lever 45 connected by means of a link 46 with an arm 47 on yoke member 10.

Raising and lowering of the cutter bar 5 is effected by means of a lifting lever 47' connected to the cutter bar 5 and the yoke member 10 through the usual lifting connections including a link 48, and a counterbalancing spring 49.

Occasionally it is desirable to change the position of sleeve portion 20 of the arch member 10 upon bearing portion 21 to make registration adjustments between the knife sections 50 of the sickle 6 and the guard fingers 51 fixed to and extending forwardly from the cutter bar 5. To change the position of sleeve 20 upon bearing portion 21 in my improved mower, it is merely necessary to displace abutment 24 by removing pin 25 and then shifting abutment 24 outwardly on bearing portion 21, after which any one or more of the spacers 32 to 34 can be displaced axially upon bearing portion 21 sufficiently to clear the end of flange 38. Then by sliding sleeve portion 20 axially outwardly of bearing portion 21 sufficiently to clear flange 43 of abutment 23, any one or more of spacers 32 to 34 may be inserted between spacer 30 and abutment 23. Or, if the adjustment is to be in the opposite direction, either one or both of spacers 30 and 31 may be removed and placed together with the spacers 32 to 34 between the outer end of sleeve portion 20 and abutment 24. The spacers are of different thicknesses to provide for different degrees of adjustment. Inasmuch as it is not necessary to completely remove the yoke member 10 from bearing portion 21 on thrust bar 20, and because it is merely necessary to shift the sleeve portion 20 a relatively slight amount upon bearing portion 21, no disconnection of the pull bar 12 or the lifting and tilting connections need be made to adjust the position of the yoke member 10 on thrust bar 20, as the amount of axial shifting of sleeve member 20 on bearing portion 21 necessary to shift any one of the washers from one end of the sleeve portion 21 to the other can be made while such connections remain intact.

What I claim is:—

1. In a mower having a yoke member to which the inner end of the cutter bar is connected, which member is connected to the mower frame by means of a thrust bar, the member having a sleeve portion journaled upon a bearing portion on the thrust bar and disposed between two spaced abutments on the bearing portion, means for fixing the position of said yoke member on said bearing portion comprising a spacer disposed between one end of said sleeve portion and the adjacent abutment, said spacer being shiftable to the opposite end of said sleeve portion whereby the position of said yoke member on said bearing portion may be adjusted, said spacer being U-shaped whereby it may be shifted from one position to another without removing said yoke member from said bearing portion.

2. In a mower having a yoke member to which the inner end of the cutter bar is connected, which member is connected to the mower frame by means of a thrust bar, the member having a sleeve portion journaled upon a bearing portion on the thrust bar and disposed between two spaced abutments on the bearing portion, means for fixing the position of said yoke member on said bearing portion comprising a spacer disposed between one end of said sleeve portion and the adjacent abutment, said spacer being shiftable to the opposite end of said sleeve portion whereby the position of said yoke member on said bearing portion may be adjusted, said spacer being U-shaped whereby it may be shifted from one position to another without removing said yoke member from said bearing portion, and means on one of said portions for holding said spacer in either position.

3. In a mower having a yoke member to which the inner end of the cutter bar is connected, which member is connected to the mower frame by means of a thrust bar, the member having a sleeve portion journaled upon a bearing portion on the thrust bar and disposed between two spaced abutments on the bearing portion, means for fixing the position of said yoke member on said bearing portion comprising a spacer disposed between one end of said sleeve portion and the adjacent abutment, said spacer being shiftable to the opposite end of said sleeve portion whereby the position of said yoke member on said bearing portion may be adjusted, said spacer being U-shaped whereby it may be shifted from one position to another without removing said yoke member from said bearing portion, and means on said sleeve portion for holding said spacer in either position.

4. In a mower having a yoke member to which the inner end of the cutter bar is connected, which member is connected to the mower frame by means of a thrust bar, the member having a sleeve portion journaled upon a bearing portion on the thrust bar and disposed between two spaced abutments on the bearing portion, means for fixing the position of said yoke member on said bearing portion comprising a spacer disposed between one end of said sleeve portion and the adjacent abutment, said spacer being shiftable to the opposite end of said sleeve portion whereby the position of said yoke member on said bearing portion may be adjusted, said spacer being U-shaped whereby it may be shifted from one position to another without removing said yoke member from said bearing portion, and means on each end of one of said portions adapted to interlock with means on said spacer to hold said spacer in either position.

5. In a mower having a yoke member to which the inner end of the cutter bar is connected, which member is connected to the mower frame by means of a thrust bar, the member having a sleeve portion journaled upon a bearing portion on the thrust bar and disposed between two spaced abutments on the bearing portion, means for fixing the position of said yoke member on said bearing portion comprising a spacer disposed between one end of said sleeve portion and the adjacent abutment, said spacer being shiftable to the opposite end of said sleeve portion whereby the position of said yoke member on said bearing portion may be adjusted, said spacer being U-shaped whereby it may be shifted from one position to another without removing said yoke member from said bearing portion, said spacer having a radially extending lug, and means on each end of one of said portions adapted to engage said lug to hold said spacer in either position.

6. In a mower having a yoke member to which the inner end of the cutter bar is connected, which member is connected to the mower frame by means of a thrust bar, the member having a sleeve portion journaled upon a bearing portion on the thrust bar and disposed between two spaced abutments on the bearing portion, means for fixing the position of said yoke member on said bearing portion comprising a spacer disposed between one end of said sleeve portion and the adjacent abutment, said spacer being shiftable to the opposite end of said sleeve portion whereby the position of said yoke member on said bearing portion may be adjusted, said spacer being U-shaped whereby it may be shifted from one position to another without removing said yoke member from said bearing portion, and a circumferentially disposed flange extending axially from each end of said sleeve portion to embrace said spacer to hold the latter in either position.

7. In a mower having a yoke member to which the inner end of the cutter bar is connected, which member is connected to the mower frame by means of a thrust bar, the member having a sleeve portion journaled upon a bearing portion on the thrust bar and disposed between two spaced abutments on the bearing portion, means for fixing the position of said yoke member on said bearing portion comprising a spacer disposed between one end of said sleeve portion and the adjacent abutment, said spacer being shiftable to the opposite end of said sleeve portion whereby the position of said yoke member on said bearing portion may be adjusted, said spacer being U-shaped whereby it may be shifted from one position to another without removing said yoke member from said bearing portion, a circumferentially disposed flange extending axially from each end of said sleeve portion to embrace said spacer to hold the latter in either position, one of said abutments being shiftable axially on said bearing portion to permit an axial shifting of said spacer beyond the end of the flange adjacent said shiftable abutment to permit removal of said spacer from a position adjacent said shiftable abutment, and to permit axial displacement of said sleeve portion relative to said bearing portion sufficient to permit the insertion of said spacer adjacent the other abutment.

8. In a mower having a yoke member to which the inner end of the cutter bar is connected, which member is connected to the mower frame by means of a thrust bar, the member having a sleeve portion journaled upon a bearing portion on the thrust bar and disposed between two spaced abutments on the bearing portion, means for fixing the position of said yoke member on said bearing portion comprising a spacer disposed between one end of said sleeve portion and the adjacent abutment, said spacer being shiftable to the opposite end of said sleeve portion whereby the position of said yoke member on said bearing portion may be adjusted, said spacer being U-shaped whereby it may be shifted from one position to another without removing said yoke member from said bearing portion, a circumferentially disposed flange extending axially from each end of said sleeve portion to embrace said spacer to hold the latter in either position, said spacer having a lug extending radially outwardly from the outer periphery thereof, said flanges having recesses in their inner periphery to receive said lug and hold said spacer against turning.

WILBUR J. COULTAS.